United States Patent
Lee et al.

(10) Patent No.: US 11,877,371 B2
(45) Date of Patent: Jan. 16, 2024

(54) INDUCTION RANGE HAVING AUTOMATIC DOUBLE SIDE ROASTING FUNCTION

(71) Applicant: PEACEWORLD. CO., LTD, Hanam-si (KR)

(72) Inventors: Myung Ock Lee, Seongnam-si (KR); Sang Woo Kim, Seongnam-si (KR)

(73) Assignee: PEACEWORLD. CO., LTD, Hanam-si (KR)

( * ) Notice: Subject to any disclaimer, the term of this patent is extended or adjusted under 35 U.S.C. 154(b) by 500 days.

(21) Appl. No.: 17/117,092

(22) Filed: Dec. 9, 2020

(65) Prior Publication Data

US 2022/0007467 A1    Jan. 6, 2022

Related U.S. Application Data

(63) Continuation of application No. PCT/KR2020/009025, filed on Jul. 9, 2020.

(30) Foreign Application Priority Data

Jul. 3, 2020  (KR) .................. 10-2020-0082082

(51) Int. Cl.
*H05B 6/06*  (2006.01)
*H05B 6/12*  (2006.01)
(Continued)

(52) U.S. Cl.
CPC .............. *H05B 6/062* (2013.01); *A47J 36/32* (2013.01); *A47J 37/0745* (2013.01); *H04N 7/18* (2013.01); *H05B 6/129* (2013.01)

(58) Field of Classification Search
CPC .......... H05B 6/062; H05B 6/129; H04N 7/18; A47J 37/0745; A47J 37/049; A47J 36/32; Y02B 40/00
See application file for complete search history.

(56) References Cited

FOREIGN PATENT DOCUMENTS

EP        1629698 B1    12/2006
JP     1992269923 A     9/1992
(Continued)

OTHER PUBLICATIONS

Japan Patent Office, Decision to Grant a Patent of Japanese Patent Application No. 2020-566265, dated Apr. 4, 2023, 5 pages.

*Primary Examiner* — Dana Ross
*Assistant Examiner* — Kuangyue Chen
(74) *Attorney, Agent, or Firm* — Nicholas Park (57) ABSTRACT

Disclosed is an induction range having an automatic double side roasting function. The induction range includes a body having an internal space in which a heating coil portion configured to perform induction heating and a rotating rod configured to provide torque of a motor are formed, an induction-exclusive container which is inserted into and mounted in the body to be tilted from the ground at a first angle and is continuously or intermittently rotatable inside the body by the rotating rod and in which an object to be cooked which is accommodated therein is cooked by induction heat transferred from a side surface of the induction-exclusive container, and a control portion including a recipe memory portion configured to store a plurality of preset recipe modes, a heating coil operation portion configured to control an operation of the heating coil portion, and a motor driving portion configured to control the motor.

9 Claims, 11 Drawing Sheets

(51) Int. Cl.
     *A47J 37/07*          (2006.01)
     *A47J 36/32*          (2006.01)
     *H04N 7/18*           (2006.01)

(56) References Cited

FOREIGN PATENT DOCUMENTS

| | | | | |
|---|---|---|---|---|
| JP | 3074082 | U | 12/2000 | |
| JP | 2001017849 | A | 1/2001 | |
| JP | 2004187840 | A | 7/2004 | |
| JP | 2004267519 | A * | 9/2004 | |
| JP | 2005278922 | A | 10/2005 | |
| JP | 2007275401 | A | 10/2007 | |
| JP | 2008086315 | A | 4/2008 | |
| JP | 2008526400 | A | 7/2008 | |
| JP | 2014108146 | A | 6/2014 | |
| JP | 2014108207 | A | 6/2014 | |
| KR | 200189552 | Y1 * | 7/2001 | |
| KR | 200422431 | Y1 * | 7/2006 | |
| KR | 2015003498 | U * | 9/2015 | .......... A47J 37/0694 |

* cited by examiner

INDUCTION RANGE HAVING AUTOMATIC DOUBLE SIDE ROASTING FUNCTION

CROSS-REFERENCE TO RELATED APPLICATION

This application is a US Bypass Continuation Application of International Application No. PCT/KR2020/009025 having a filing date of Jul. 9, 2020 and designating the United States, the International Application claiming priority date of Jul. 3, 2020 based on prior filed Korean Patent Application No. 10-2020-0082082, filed on Jul. 3, 2020, the disclosure of which is incorporated herein by reference in its entirety.

BACKGROUND

1. Field of the Invention

The present invention relates an induction range, and more particularly, to an induction range having an automatic double side roasting function which automatically performs cooking of a variety of types of food which need to be roasted on both sides.

2. Discussion of Related Art

As heating devices for cooking food, a microwave oven, a gas stove, an electric oven, and the like have been used. However, recently, due to indoor air pollution, an increase in indoor temperature, and the like, use of induction ranges is explosively increasing. Induction ranges are heating cooking devices employing an induction heating method and have great advantages in high energy efficiency and stability.

Induction ranges have advantages of being free from oxygen consumption and waste gas emission. In induction ranges, only an induction-exclusive container itself is heated by a resistant component using an eddy current generated when a line of magnetic force generated by an applied high frequency current passes a bottom of the induction-exclusive container disposed on a plate of the induction range.

However, conventional induction ranges have been developed to be used mainly to heat food inside an induction-exclusive container disposed on a top plate of the range. In this case, it is necessary for a user to perform an operation of turning over or mixing food pieces one by one during a cooking process. Particularly, since it is difficult to adequately roast, according to users' tastes, food such as meat, fish, and the like which have been generally cooked to eat at home, induction ranges capable of overcoming such a difficulty are currently nonexistent.

Also, a result of searching related arts, there are few documents providing an effective overcoming method with respect thereto.

RELATED ART DOCUMENT

Patent Document

Patent Document 1: Europe Patent Publication No. EP1629698 (registered on Dec. 27, 2006)

SUMMARY OF THE INVENTION

The present invention is directed to providing an induction range having an automatic cooking function with respect to a variety of types of food using an induction technique.

In more detail, there is provided an induction range which automatically performs an operation of turning over or mixing food and is adequate for double side roasting for fish or the like which needs to be uniformly roasted over an upper surface and a lower surface thereof. Also, the induction range may be aesthetically tidy and may be improved to be conveniently cleaned and easily used and manipulated.

Also, separate components may be produced by unit modules so as to maximize convenience in maintenance/operation as well as minimizing maintenance/operation costs. Also, separate components may be easily coupled to one another so as to be easily exchanged and replaced even when a partial failure or the like occurs.

Accordingly, provided is an induction range having an automatic double side roasting function which can improve qualities, performance, and the like thereof overall and secure overall competitiveness corresponding to consumer needs.

According to an aspect of the present invention, there is provided an induction range having an automatic double side roasting function. The induction range includes a body having an internal space in which a heating coil portion configured to perform induction heating and a rotating rod configured to provide torque of a motor are formed, an induction-exclusive container which is inserted into and mounted in the body to be tilted from the ground at a first angle and is continuously or intermittently rotatable inside the body by the rotating rod and in which an object to be cooked which is accommodated therein is cooked by induction heat transferred from a side surface of the induction-exclusive container, and a control portion including a recipe memory portion configured to store a plurality of preset recipe modes, a heating coil operation portion configured to control an operation of the heating coil portion, and a motor driving portion configured to control operation of the motor.

A position indication portion protruding outward may be formed on a bottom part of the induction-exclusive container. Also, a position detection portion configured to detect a rotation angle position of the induction-exclusive container using a method of coming into contact with the position indication portion may be formed on the body adjacent to the bottom part of the induction-exclusive container.

The control portion may further include a position input portion configured to determine whether the induction-exclusive container is aligned using the position detection portion. Here, the motor driving portion may adjust a rotation angle of the induction-exclusive container by controlling the motor on the basis of a signal of the position detection portion.

The position indication portion may include a first position indication portion and a second position indication portion which have different contact areas and are disposed to be opposite each other. Here, the position detection portion may generate a signal for moving the induction-exclusive container to a start position or an end position using a difference in contact times according to contact areas.

The motor driving portion may rotate the induction-exclusive container by 180 degrees intermittently by controlling the motor on the basis of contact made by the position detection portion according to the recipe mode.

The induction-exclusive container may have a shape of which a radius gradually increases in a direction from the bottom part toward an opening surface of an inlet. Here, each pair of first overturning members disposed to face each other at 180 degree intervals and configured to turn over a heated surface of the object to be cooked by 180 degrees under the control of the motor driving portion may be formed on an inner surface of the induction-exclusive container.

Each of the first overturning members may include a holding surface portion which is one side thereof and formed as a flat surface, a first curved portion which is the other side and intersects with an end of the holding surface portion and extending to be concave inward, an assistance surface portion extending from the first curved portion and formed to be convex outward so as to assist an operation of turning over the object to be cooked by 180 degrees, and a second curved portion formed to extend from the assistance surface portion toward the inner surface of the induction-exclusive container.

Second overturning members protruding inward and configured to turn over a heated surface of the object to be cooked under the control of the motor driving portion may be formed on a bottom part of the induction-exclusive container.

One or more discharge holes located at a certain height from a bottom part of the induction-exclusive container may be formed in the side surface of the induction-exclusive container.

The control portion may further include an alarm portion configured to generate a variety of alarm messages related to a cooking state during a sequential cooking process according to the recipe mode.

The body may further include a camera module configured to capture images of a cooking state inside the induction-exclusive container in real time.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, in a description of embodiments of the present invention, a detailed description of a well-known technology of the related art will be omitted when it is deemed to obscure the essence of the present invention. The terms used herein are used merely for describing particular embodiments and are not intended to limit the present invention. Singular expressions, unless clearly defined otherwise in context, include plural expressions.

Throughout the application, the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Hereinafter, detailed embodiments of the present invention will be described in detail with reference to the drawings.

Figure 1:
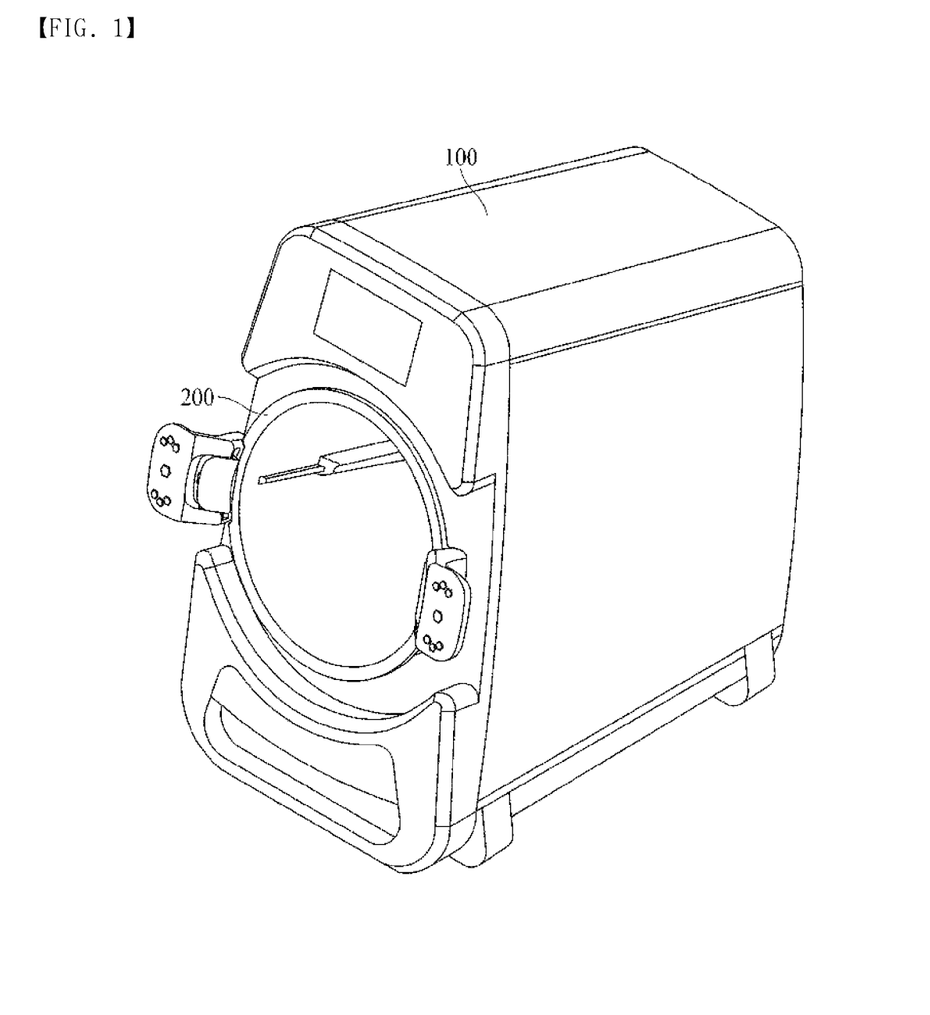
FIG. 1 is a perspective view of an induction range having an automatic double side roasting function according to one embodiment of the present invention.
Figure 2:
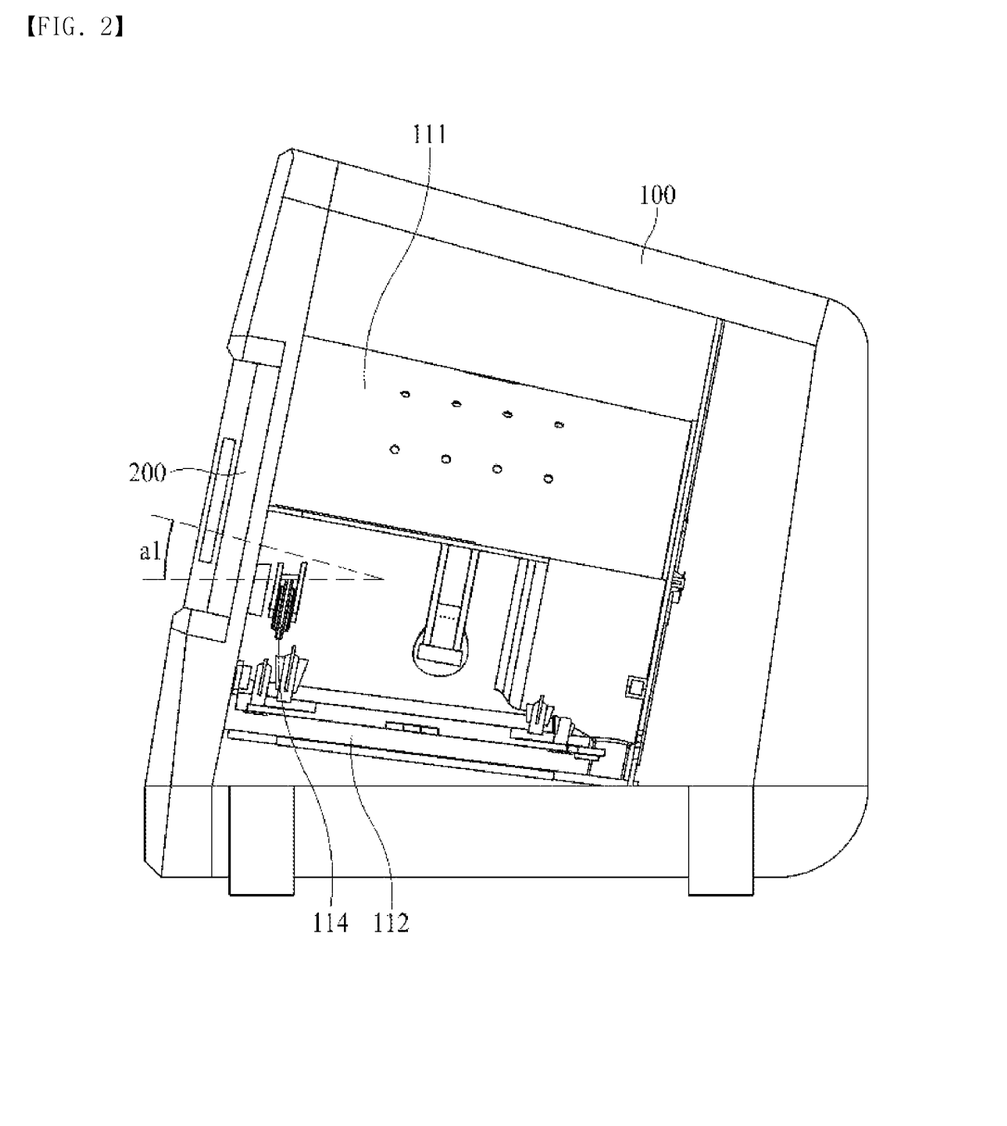
FIG. 2 is a side view of the induction range of FIG. 1 and illustrates a state in which a body is partially removed.
Figure 3A:
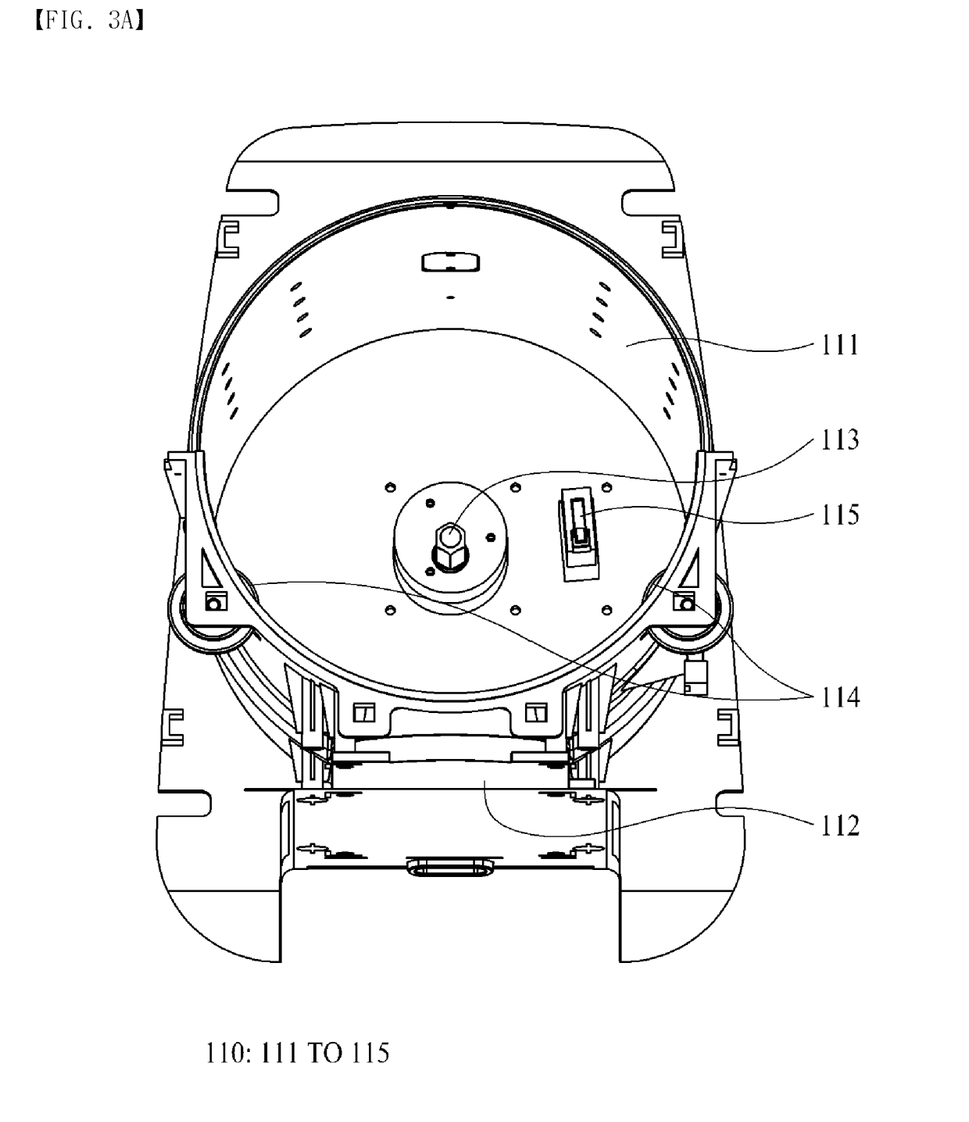
FIG. 3A is a perspective view illustrating a sleeve module of FIG. 1.
Figure 3B:
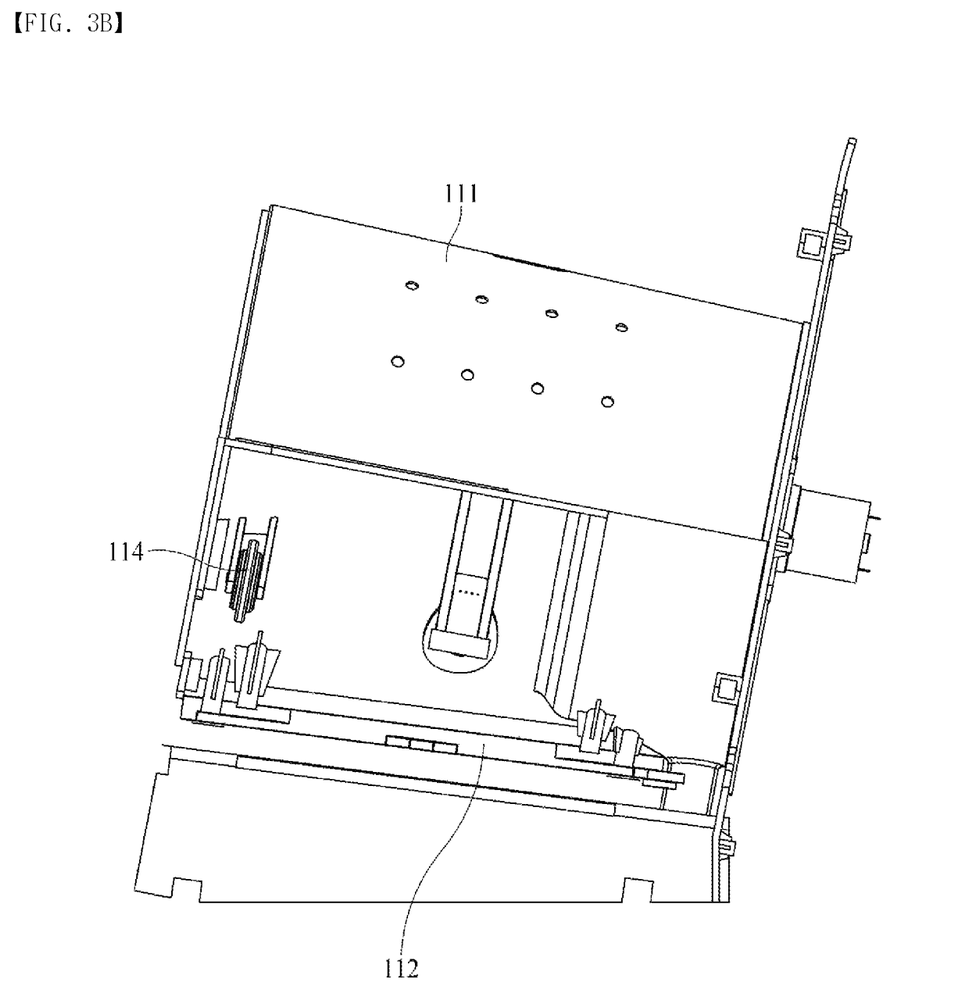
FIG. 3B is a side view illustrating the sleeve module of FIG. 1.
Figure 4A:
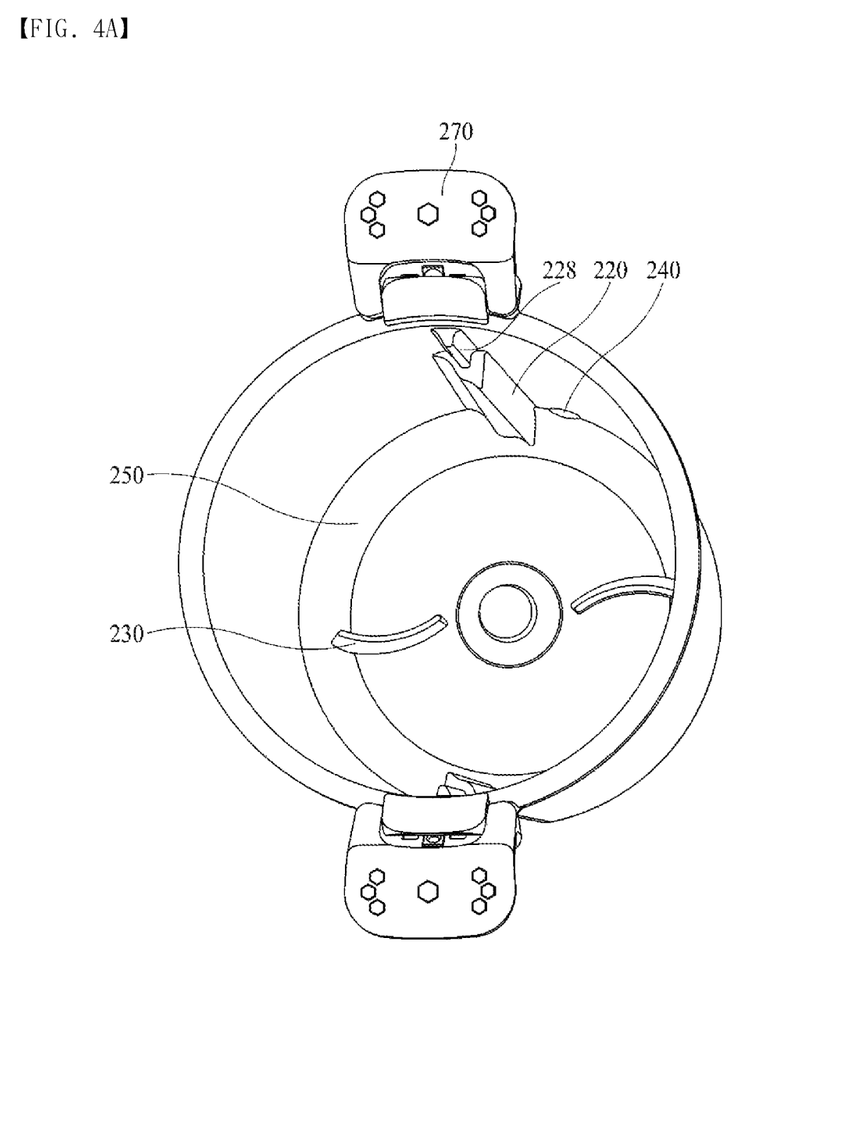
FIG. 4A is a perspective view illustrating an induction-exclusive container of FIG. 1.
Figure 4B:
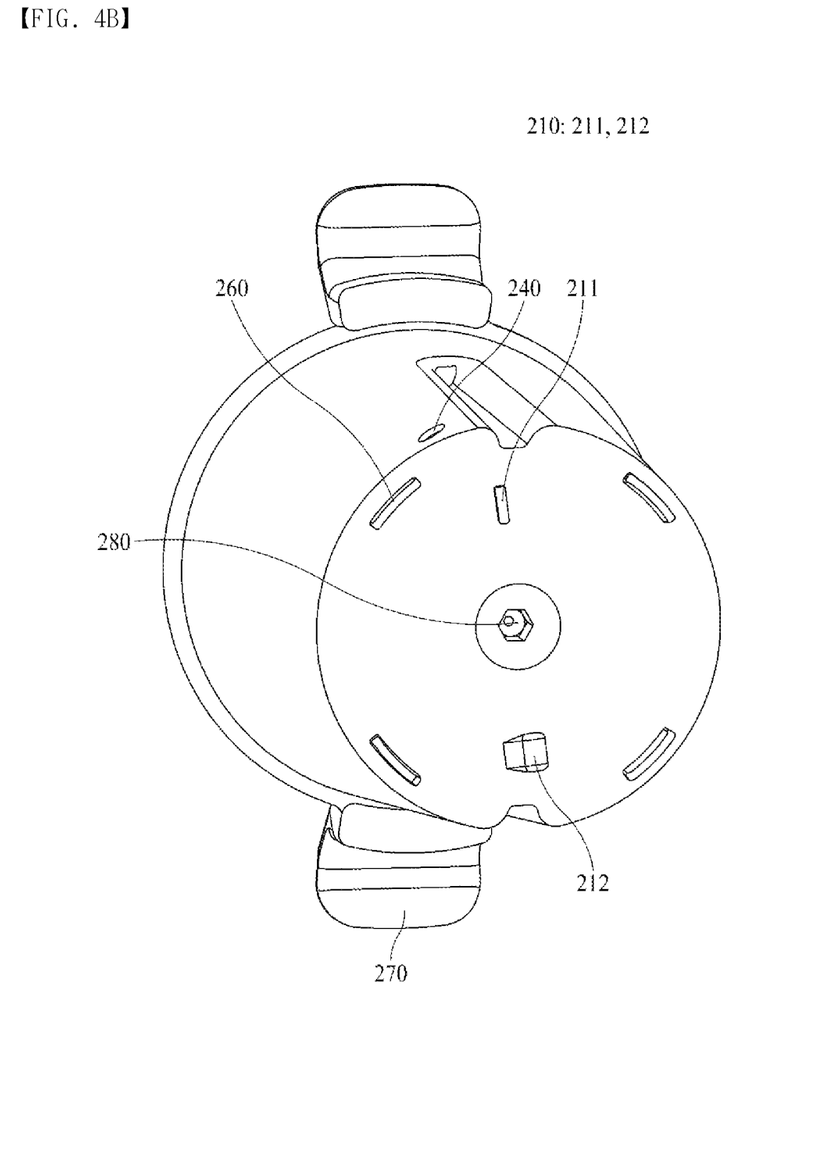
FIG. 4B is a bottom perspective view illustrating the induction-exclusive container of FIG. 1.
Figure 4C:
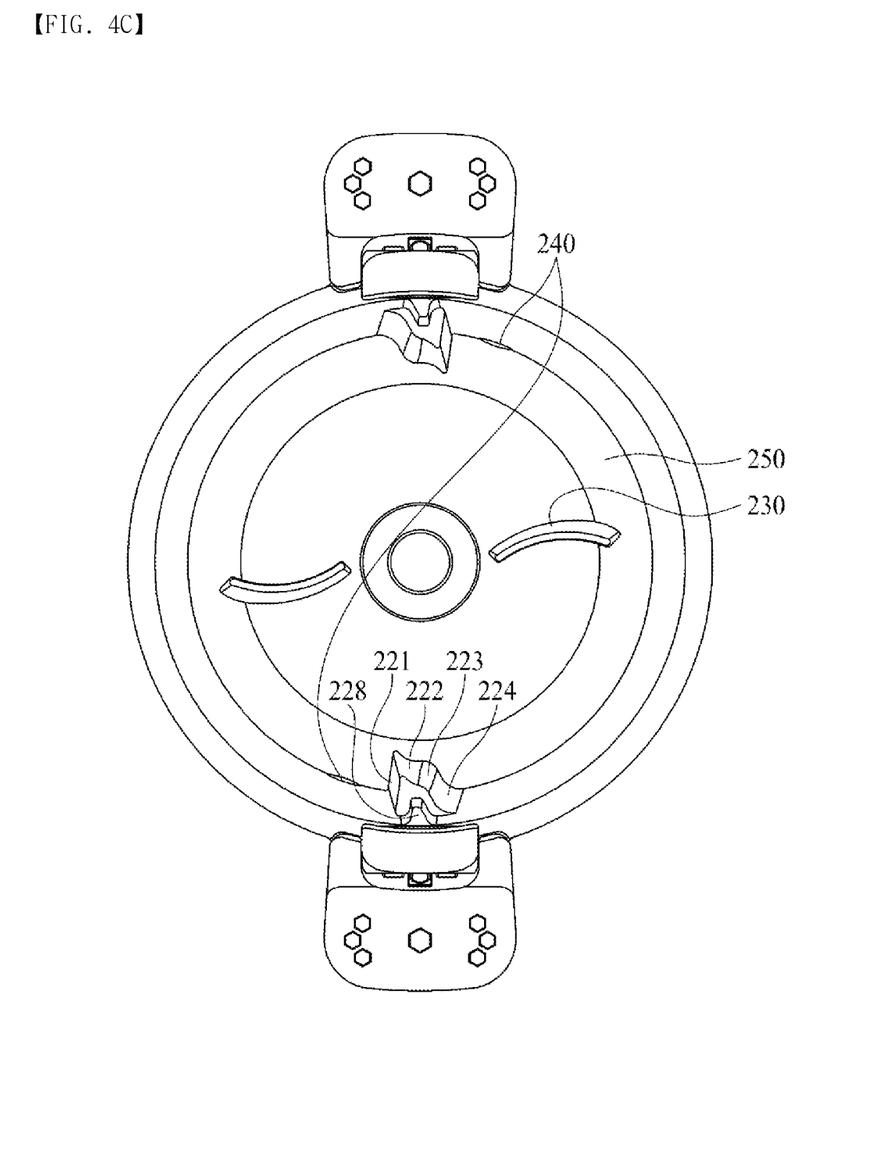
FIG. 4C is a plan view illustrating the induction-exclusive container of FIG. 1.
Figure 5:
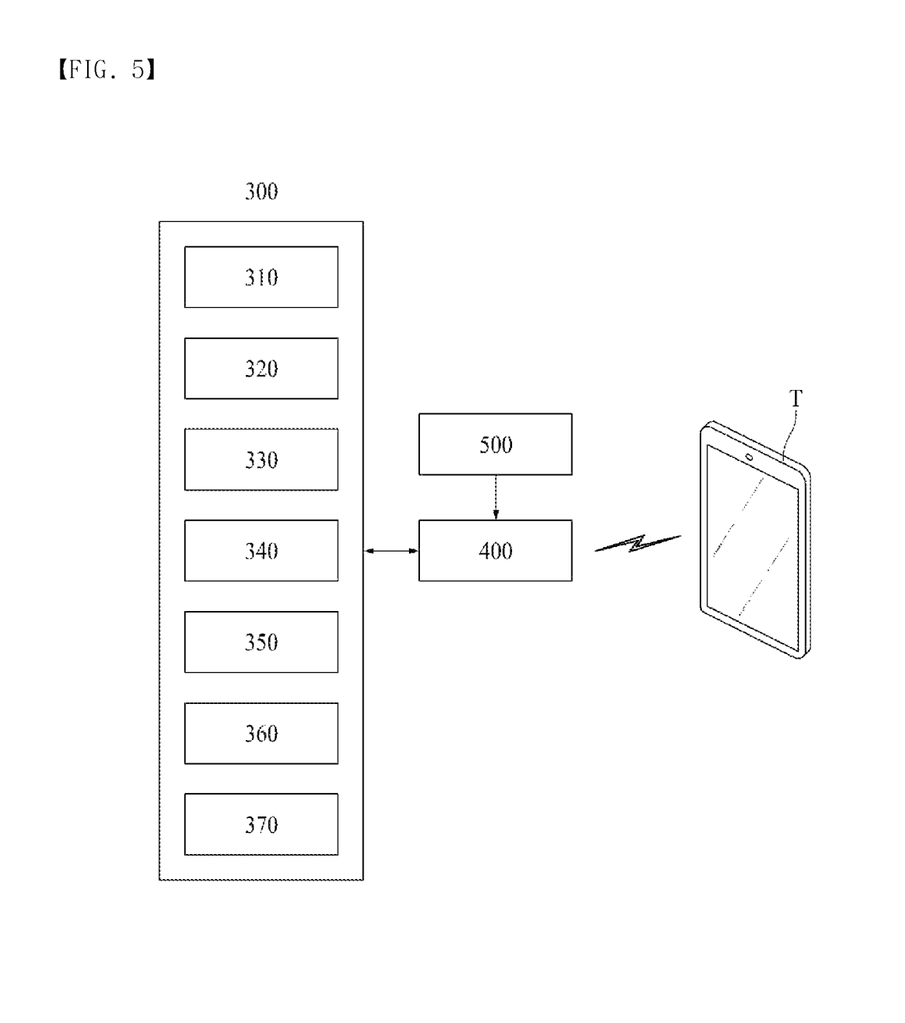
FIG. 5 is a block diagram illustrating a control portion according to one embodiment of the present invention.
Figure 6:
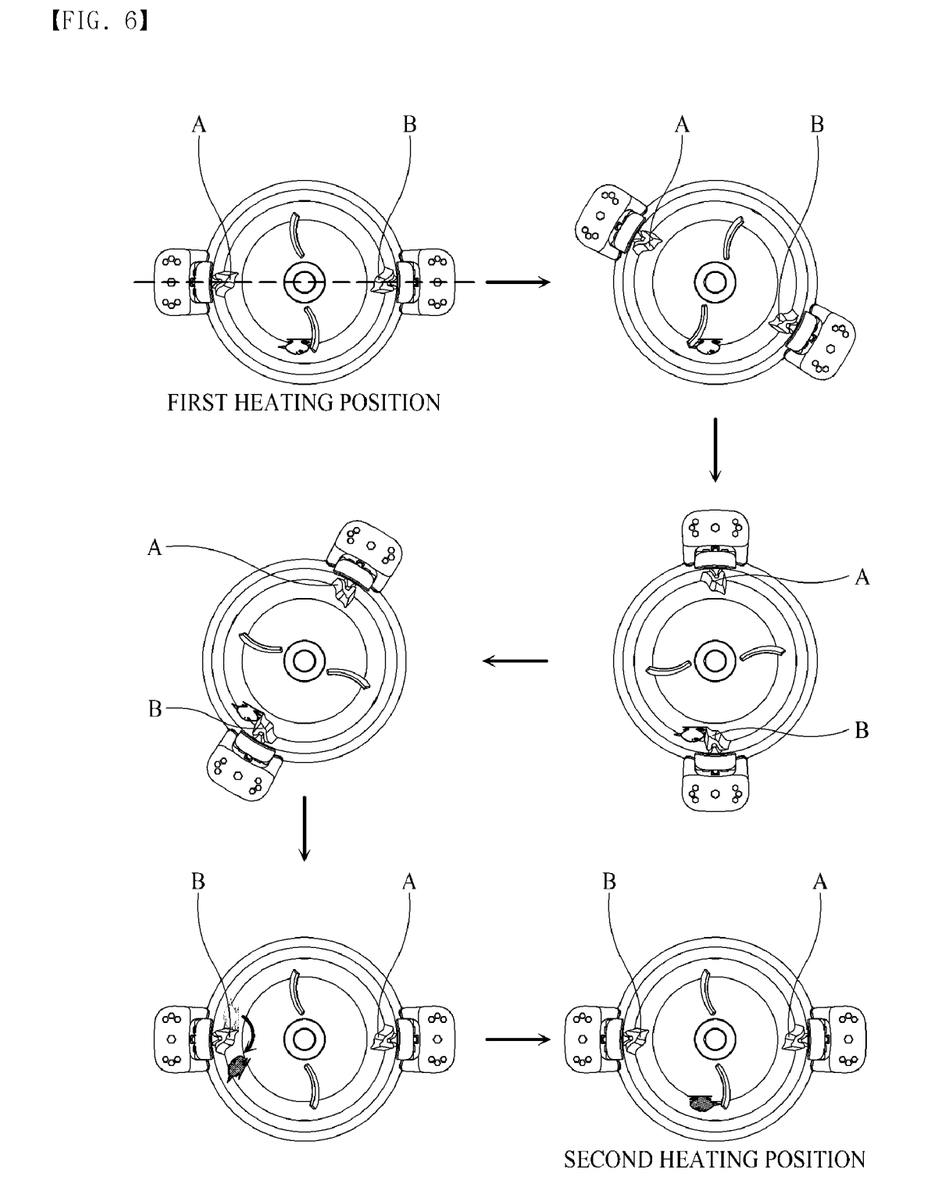
FIG. 6 is a view illustrating a part of a fish roasting process in a second recipe mode when the induction-exclusive container of FIG. 1 is used.

FIG. 1 is a perspective view of an induction range having an automatic double side roasting function according to one embodiment of the present invention. FIG. 2 is a side view of the induction range of FIG. 1 and illustrates a state in which a body is partially removed. FIG. 3A is a perspective view illustrating a sleeve module of FIG. 1, and FIG. 3B is a side view illustrating the sleeve module of FIG. 1. FIG. 4A is a perspective view illustrating an induction-exclusive container of FIG. 1, FIG. 4B is a bottom perspective view illustrating the induction-exclusive container of FIG. 1, and FIG. 4C is a plan view illustrating the induction-exclusive container of FIG. 1. FIG. 5 is a block diagram illustrating a control portion according to one embodiment of the present invention. FIG. 6 is a view illustrating a part of a fish roasting process in a second recipe mode when the induction-exclusive container of FIG. 1 is used.

Referring to FIGS. 1 to 6, an induction range having an automatic double side roasting function according to one embodiment of the present invention may include a body 100, an induction-exclusive container 200, a control portion 300, and the like. In more detail, in the body 100, a sleeve module 110, a heating coil portion 112, a rotating rod 113, a roller member 114, a position detection portion 115, a temperature sensor (not shown), a weight sensor (not shown), a display portion (not shown), a communication module 400, a camera module 500, and the like may be further included.

The body 100 forms an internal accommodation space with a casing formed using a synthetic resin injection material. The body 100 includes a sleeve member 111 configured to guide pivoting of the induction-exclusive container 200 inserted and mounted therein. Meanwhile, the sleeve module 110 may be formed by a single component unit formed by coupling the heating coil portion 112, the rotating rod 113, the roller member 114, the position detection portion 115, and the like to the sleeve member 111. This module may allow repairs, replacement, and the like in a situation such as a failure to be easily performed as well as reducing manufacturing costs and the like.

The heating coil portion 112 may be installed in the internal space of the body 100, for example, on an outer circumference of a lower side of the sleeve member 111. The heating coil portion 112 may be installed at an arbitrary position on the outer circumference of the sleeve member 111. On the other hand, one or more heating coil portions 112 may not be fixedly installed directly on the sleeve member 111 and may be formed at any positions in the internal space of the body 100. The heating coil portion 112 is used for induction heating.

The heating coil portion 112 may be formed in an injection material having a flat plate shape. Also, the heating coil portion 112 is disposed in a longitudinal direction of the sleeve member 111 to maintain a certain distance from the outer circumference of the sleeve member 111. Accordingly, the heating coil portion 112 may efficiently heat the induction-exclusive container 200 which rotates and has a cylindrical shape.

The rotating rod 113 provides torque of motor to rotate the induction-exclusive container 200. For example, the rotating rod 113 may rotate the induction-exclusive container 200 connected thereto using a rod connected directly to a rotation shaft of the motor and having a certain shape under preset conditions.

In a process of rotating the induction-exclusive container 200, the roller member 114 may support an inlet side of the induction-exclusive container 200 inserted and mounted to be tilted toward one side so as to remove a weight of the induction-exclusive container 200 which is applied to the rotating rod 113. Also, the roller member 114 rolls due to rotation of the induction-exclusive container 200 caused by the rotating rod 113. The roller member 114 is fixedly installed in a mounting portion separately provided on the sleeve member 111.

Meanwhile, an accommodation portion (not shown) configured to accommodate an internal fluid such as an oil discharged from the induction-exclusive container 200 while cooking is disposed on a lower side of the body 100. The accommodation portion is separably formed in the internal space of the body 100 so as to easily separate and dispose waste oil and to be smoothly and simply cleaned.

The position detection portion 115 is formed at a position adjacent to a bottom part of the induction-exclusive container 200. The position detection portion 115 detects a rotation angle position of the induction-exclusive container 200 using a method of coming into contact with position indication portions 210 formed on the induction-exclusive container 200. The position detection portion 115 may be a sort of switch (micro switch) configured to detect a position through physical contact with the position indication portion 210. Accordingly, in controlling the rotation angle position of the induction-exclusive container 200, a limitation or generated error in control algorithms with respect to a motor driving portion 330 may be eliminated. That is, driving conditions of the motor may vary according to a control signal of the motor driving portion 330. Particularly, according to a change in conditions such as a rotation speed, a rotation time, torque, and the like, a method of controlling the motor using the motor driving portion 330 degrades precision of the rotation angle position of the induction-exclusive container 200.

Meanwhile, the position detection portion 115 may generate a signal for moving the induction-exclusive container 200 to a start position or an end position using a difference in contact times according to contact areas. To this end, the position indication portions 210 may have mutually different contact areas.

The position detection portion 115 may be formed, for example, on a bottom surface of the sleeve member 111 on which the rotating rod 113 is disposed. The position detection portion 115 may protrude near the rotating rod 113 and come into contact with the position indication portion 210.

The temperature sensor may be formed in the internal space of the body 100. The temperature sensor measures a temperature of the induction-exclusive container 200, which rotates, in real time and transmits the measured temperature to a temperature input portion 350. The control portion 300 may include the temperature input portion 350. An object to be cooked may be cooked at a cooking temperature corresponding to a recipe mode due to the temperature sensor. Meanwhile, a temperature measured by the temperature sensor may be displayed on the display portion of the body 100 so that a user may see the temperature. Also, the control portion 300 may control operations, that is, a heating level, a heating time, and the like of the heating coil portion 112 on the basis of the temperature input to the temperature input portion 350.

The weight sensor measures a weight of an object to be cooked, that is, food accommodated in the induction-exclusive container 200. Meanwhile, the control portion 300 may further include a weight information input portion 360. A signal with respect to the weight of the object to be cooked which is measured by the weight sensor is input to the weight information input portion 360. Meanwhile, the control portion 300 may control a heating coil operation portion 320 on the basis of the weight input to the weight information input portion 360. Also, weight information input to the weight information input portion 360 may be displayed on the display portion.

The body 100 may include the display portion configured to provide the user with a variety of pieces of visual information.

Next, the induction-exclusive container 200 may include the position indication portions 210, a first overturning member 220, a second overturning member 230, a discharge hole 240, a discharge inducement portion 250, and the like. The induction-exclusive container 200 is inserted into and mounted in the body 100 to be tilted at a first angle a1 with respect to the ground, is continuously or intermittently rotatable in the body 100 due to the rotating rod 113, and allows an object to be cooked which is accommodated thereinside to be cooked by induction heating transferred from a side surface thereof. The induction-exclusive container 200 may further include a lid (not shown) configured to open or close the induction-exclusive container 200. At least a part of the lid is formed of a transparent material such as glass and the like so as to allow a cooking state inside the induction-exclusive container 200 to be seen. One or more through holes configured to prevent a pressure inside the induction-exclusive container 200 from excessively increasing may be formed in the lid.

The induction-exclusive container 200 has a shape of which a radius gradually increases in a direction from a bottom portion toward an opening surface of an inlet. Also, the induction-exclusive container 200 may be formed of a material capable of induction heating, for example, a metal such as cast iron, steel, and the like. The induction-exclusive container 200 may be formed of a spray-coated aluminum material. Here, spray coating is performed while being limited to the side surface of the induction-exclusive container 200. As a result, the bottom surface of the induction-exclusive container 200 is not heated by the heating coil portion 112 such that a surface of a table formed of glass or the like is not damaged even when the induction-exclusive container 200 is disposed thereon right after the end of cooking. Also, disposition protrusion portions 260 may be formed outside the bottom surface of the induction-exclusive container 200 to protrude therefrom. Also, since the disposition protrusion portions 260 are not heated by the heating coil portion 112, even when the induction-exclusive container 200 at a high temperature is disposed on the table formed of glass or the like right after the end of cooking, there is no worry about cracks or breakage of the glass.

A grip portion 270 may be formed on the induction-exclusive container 200. The grip portion 270 may be used for transferring the induction-exclusive container 200 and mounting or demounting the induction-exclusive container 200 in or from the body 100. Also, the position indication portions 210 protruding outward are formed on the bottom portion of the induction-exclusive container 200. The position indication portions 210 are formed to be detected by the position detection portion 115 using a contact method. The position indication portions 210 according to one embodiment may include a first position indication portion 211 and a second position indication portion 212 disposed to be opposite each other. The position indication portions 210 provide a rotation angle checking function to allow the induction-exclusive container 200 to rotate at 180 degree intervals. Also, the position indication portions 210 are formed to have different contact areas. To this end, top surfaces of the position indication portions 210 may include flat surfaces.

Also, a fastening groove 280 to which the rotating rod 113 is fastened is formed outside the bottom surface of the induction-exclusive container 200. For example, the fastening groove 280 may be formed to be recessed from the bottom surface of the induction-exclusive container 200. Meanwhile, the fastening groove 280 increases a volume of the induction-exclusive container 200 so as to input a larger amount of an object to be cooked and facilitates convenient cleaning or the like after cooking. Meanwhile, even when the rotating rod 113 is formed to have a short length, the induction-exclusive container 200 may be smoothly rotated through the roller member 114 and the sleeve member 111 which are arranged on the sleeve module 110.

A pair of such first overturning members 220 disposed to face each other and configured to turn a heated surface of the object to be cooked by 180 degrees under the control of the motor driving portion 330 may be formed on an inner surface of the induction-exclusive container 200. The first overturning member 220 may be used effectively when the heated surface of the object to be cooked is divided, particularly, into an upper surface and a lower surface. That is, the first overturning member 220 is considerably useful when the object to be cooked is repetitively turned over in an order of the upper surface→the lower surface→the upper surface→the lower surface and the like. To this end, a pair of, that is, two, overturning members facing each other may be formed. The first overturning members 220 may be formed on the inner surface of the induction-exclusive container 200 along a longitudinal direction.

In detail, the first overturning member 220 may include a holding surface portion 221 which is one side thereof and formed as a flat surface, a first curved portion 222 which is the other side and intersects with an end of the holding surface portion 221 and concavely extending inward, an assistance surface portion 223 extending from the first curved portion 222 and formed to be externally convex and to assist an operation of turning over the object to be cooked, and a second curved portion 224 formed to extend from the assistance surface portion 223 toward the inner surface of the induction-exclusive container 200.

The holding surface portion 221 is formed to extend from the inner surface of the induction-exclusive container 200 to be substantially perpendicular thereto. In a process in which the induction-exclusive container 200 rotates by 180 degrees, the holding surface portion 221 allows the object to be cooked, which is held by the holding surface portion 221, to be kept pressed against the inner surface of the induction-exclusive container 200 for a longer time and then be turned over. To this end, the holding surface portion 221 may be formed as a flat surface having a certain area. Meanwhile, the assistance surface portion 223 may prevent a phenomenon in which the object to be cooked is turned over again while being turned over. Here, a convex surface formed on the assistance surface portion 223 may perform a function of partially dispersing a shock applied to the object to be cooked when the object to be cooked, which falls while being overturned, comes into contact with the convex surface before colliding with the inner surface of the induction-exclusive container 200.

A first overturning extension member 228 is formed to extend from a longitudinal end of the first overturning member 220 in the same direction as that of the first overturning member 220. The first overturning extension member 228 may have one side and the other side both of which are curved portions. Also, an intersection surface may be formed at a part where the one side and the other side meet each other. The first overturning extension member 228 assists a function and a role of the first overturning member 220.

Also, the second overturning member 230 which protrudes inward and turns over the heated surface of the object to be cooked under the control of the motor driving portion 330 may be formed on the bottom part of the induction-exclusive container 200. The second overturning member 230 may have an arcuate shape when the induction-exclusive container 200 is viewed from above. Here, such second overturning members 230 are disposed to face each other to mix or turn over a small-sized object to be cooked which is located on the bottom part of the induction-exclusive container 200 while hitting the object according to rotation of the induction-exclusive container 200. The second overturning member 230 is opened in a rotational direction of the induction-exclusive container 200 so that the object to be cooked is moved thereinside to be pressed against the bottom part of the induction-exclusive container 200 for a longer time and then be turned over by the second overturning member 230. Accordingly, the heated surface of the object to be cooked may be more effectively turned over. That is, the second overturning member 230 may relieve inconvenience of mixing or overturning the small-sized object to be cooked according to the rotation of the induction-exclusive container 200.

One or more discharge holes 240 located at a certain height from the bottom part of the induction-exclusive container 200 may be formed in the side surface of the induction-exclusive container 200. A pair of (two) discharge holes 240 according to one embodiment may be formed at positions facing each other. Particularly, referring to FIG. 4C, each of the discharge holes 240 may be located in the immediate vicinity of each of the holding surface portions 221 of the first overturning members 220. Accordingly, referring to FIG. 6, at a first heating position, the discharge holes 240 are allowed to be at a certain height with relation to a place where fish is located.

At the first heating position, the induction-exclusive container 200 remains in a state in which rotation is stopped for a certain time and the fish is roasted while being heated by the heating coil portion 112. In this process, an internal space of the induction-exclusive container 200 may be filled with fine dust generated from the fish, steam causing odor, or the like. Here, the discharge holes 240 discharge the steam or the like from the internal space of the induction-exclusive container 200 at the first heating position. Simultaneously, at the first heating position, the discharge holes 240 allow oils injected, by the user, into the induction-exclusive container 200 before a start of cooking, fish oil naturally generated from the fish during a cooking process, or the like to remain (stagnate) in the internal space of the induction-exclusive container 200, particularly, at a place where the fish is located.

Also, the discharge holes 240 partially discharge fluids such as fish oil and the like which remain in the induction-exclusive container 200 while the induction-exclusive container 200 rotates by 180 degrees and changes in position from the first heating position to a second heating position. To this end, the induction-exclusive container 200 may be provided with a discharge inducement portion 250 configured to guide an internal fluid to the discharge holes 240 while the induction-exclusive container 200 is tilted at the first angle a1. The discharge inducement portion 250 may be a rounded surface which connects the bottom part of the induction-exclusive container 200 to the discharge holes 240. That is, the induction-exclusive container 200 may partially discharge the internal fluid through the discharge holes 240 while being tilted at a certain angle. Instead, the discharge holes 240 never discharge the internal fluid into an external space of the induction-exclusive container 200 while the induction-exclusive container 200 is standing upward to be perpendicular to the ground.

The control portion 300 may include a recipe memory portion 310, a heating coil operation portion 320, the motor driving portion 330, a position input portion 340, a temperature input portion 350, a weight information input portion 360, an alarm portion 370, and the like. The recipe memory portion 310 stores a plurality of preset recipe modes. The recipe memory portion 310 may be configured to communicate with an external server so as to periodically update the stored recipe modes. Meanwhile, in each of the recipe modes, cooking conditions and a cooking sequence with respect to an object to be cooked are stored. The recipe modes may include a first recipe mode and a second recipe mode. For example, the first recipe mode is adequate for an object to be cooked which needs to be mixed or turned over frequently during a cooking process.

On the other hand, the second recipe is adequate for an object to be cooked which does not need to be frequently turned over during a cooking process. In the second recipe mode, for example, recipes with respect to fish roasting may be stored. When the second recipe mode is selected by the user, the control portion 300 executes the second recipe mode of the recipe memory portion 310 and drives the induction range according to cooking conditions and a cooking sequence which are stored in the second recipe mode.

In the case of fish roasting, when fish is turned over by rotating the induction-exclusive container 200 before being roasted to a certain degree, a shape of the fish may be broken. Accordingly, at the first heating position, the induction-exclusive container 200 remains in a state in which rotation is stopped for a certain time and the fish is heated and roasted by the heating coil portion 112. Subsequently, the induction-exclusive container 200 rotates by 180 degrees under the control of the motor by the motor driving portion 330 so as to turn over the fish. That is, driving of the motor at the second heating position is stopped by the motor driving portion 330 and the induction-exclusive container 200 also remains in a state in which rotation is stopped again for a certain time. Here, an opposite side of the overturned fish is heated and roasted by the heating coil portion 112. The fish may be completely roasted by repetitively performing the above process.

The heating coil operation portion 320 controls the operation of the heating coil portion 112. The heating coil operation portion 320 may input power to the heating coil portion 112 and control a heating level and a heating time of the heating coil portion 112.

The motor driving portion 330 may control the operation of the motor. The motor driving portion 330 controls rotation of the motor which is a driving device configured to rotate the rotating rod 113. The motor driving portion 330 may control a rotation speed, a rotation time, a rotation period, a rotation interval, a number of rotations, and the like of the motor. The motor driving portion 330 may precisely adjust a rotation angle of the induction-exclusive container 200 by controlling the motor on the basis of a signal of the position detection portion 115.

The motor driving portion 330 allows the induction-exclusive container 200 to continuously or intermittently rotate inside the body by controlling the motor. For example, the motor driving portion 330 may intermittently rotate the induction-exclusive container 200 at 180 degree intervals by controlling the motor on the basis of contact made by the position detection portion 115 according to a recipe mode.

The position input portion 340 determines whether the induction-exclusive container 200 is aligned using the position detection portion 115. The position input portion 340 receives information with respect to a stop position of the induction-exclusive container 200 using the position detection portion 115. When it is determined using the position input portion 340 that the induction-exclusive container 200 stops at a different position which is not a preset stop position, the control portion 300 drives the motor by controlling of the motor driving portion 330 so as to rotate the induction-exclusive container 200 until the induction-exclusive container 200 arrives at the stop position. That is, at an end of cooking according to the recipe mode, the induction-exclusive container 200 may be precisely located at the above end position and then be stopped.

At the end position, the induction-exclusive container 200 is located at a position where a communication direction of the discharge hole 240 does not coincide with a gravity direction and while, simultaneously, a fluid such as oil and the like is incapable of being discharged outward.

The temperature input portion 350 receives temperature information measured by the temperature sensor and controls the heating coil operation portion 320 so that a cooking temperature is adequate for a preset temperature condition to adjust a heating level and/or a heating time or to cut off power. The weight information input portion 360 may receive weight information of an object to be cooked which is measured by the weight sensor to control the heating coil operation portion 320.

Also, the control portion 300 may further include the alarm portion 370 configured to a variety of alarm messages related to a cooking state during sequential cooking processes according to the recipe mode. For example, the alarm portion 370 may generate an alarm message such as "cooking completion" and the like when cooking is completed. Also, the alarm portion 370 may generate an alarm message, for example, "ten seconds left before cooking completion" five to sixty seconds before the cooking completion. Also, the alarm portion 370 may generate a variety of types of alarm messages such as "five minutes have passed after cooking completion" and the like. Meanwhile, the alarm message may be transmitted, for example, to a user terminal T or the like through a communication module 400. Accordingly, the user may easily grasp a cooking process and enjoy convenience through being provided with reminder information with respect to cooking.

Meanwhile, the body 100 may include the communication module 400 capable of performing short-range wireless communication. The communication module 400 may be a radio frequency (RF) module, a Bluetooth module, a quick response (QR) code, or the like. The induction range is configured to communicate with the external user terminal T through the communication module 400. The user terminal T may be paired with the induction range through the communication module 400 and then control the induction range according to an operation of the user. To this end, a dedicated mobile application or the like may be installed in the user terminal T. When a request for a particular type of food cooking method or recipe is selected in the user terminal T, the control portion 300 may receive the request of the user terminal T and control the induction range according thereto. Also, the communication module 400 may transmit a variety of alarm signals generated by the alarm portion 370, for example, "cooking completion," "ten minutes left before cooking completion," "five minutes have passed after cooking completion," and the like to the user terminal T.

Also, the body 100 may further include the camera module 500 configured to capture images of a cooking state inside the induction-exclusive container 200 in real time. The camera module 500 is installed in any one place on an outer surface of the body and captures images or videos related to a cooking state of food. The camera module 500 may capture images of an inside of the induction-exclusive container through the lid. An operation of the camera module 500 may be controlled from a cooking-start point according to a cooking sequence. Also, the camera module 500 may be electrically connected to the communication module 400 so as to transmit images or videos obtained by the camera module 500 to the user terminal T.

Figure 7:
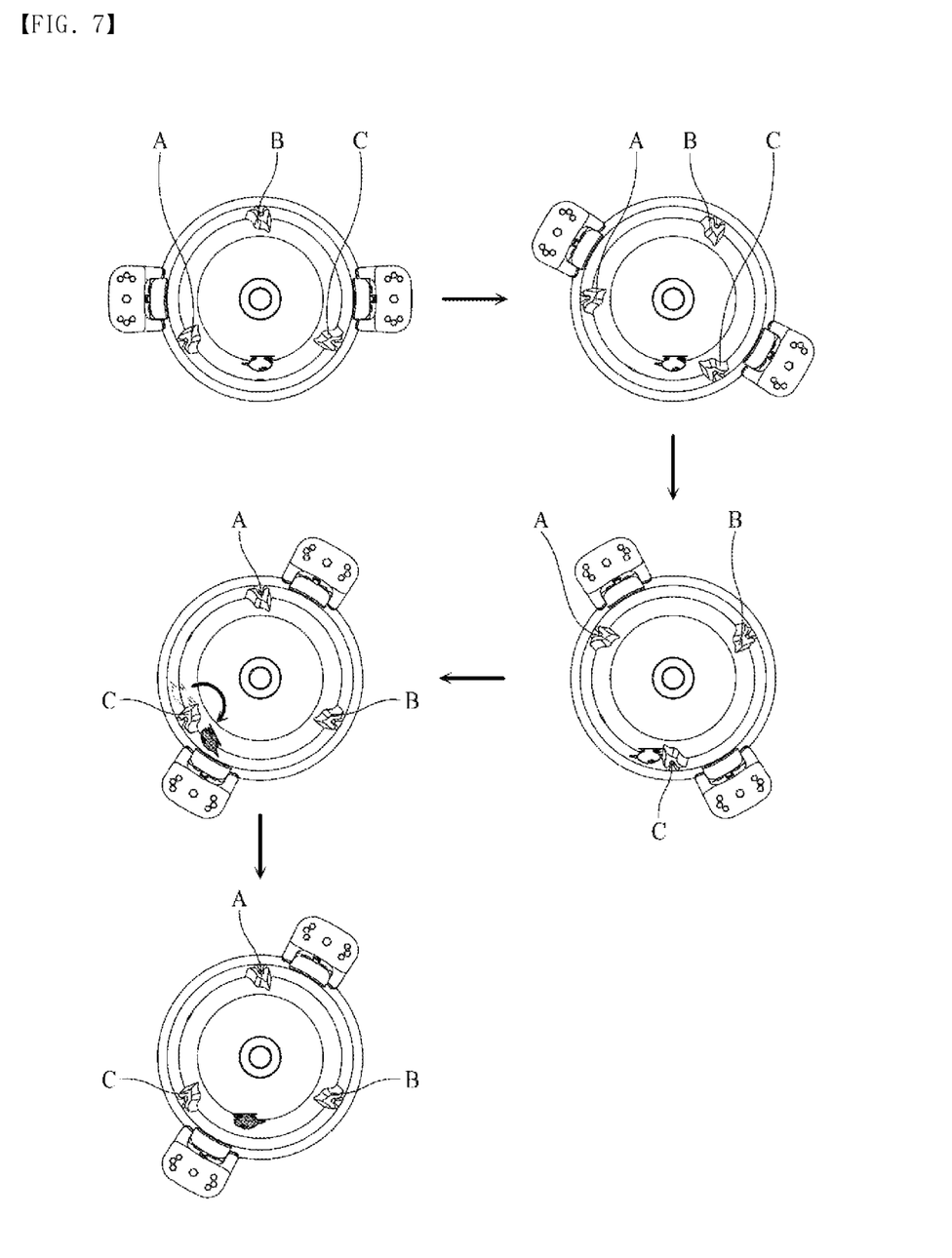
FIG. 7 is a view illustrating a part of a fish roasting process in a second recipe mode when an induction-exclusive container according to another embodiment of the present invention is used.

FIG. 7 is a view illustrating a part of a fish roasting process in a second recipe mode when an induction-exclusive container according to another embodiment of the present invention is used. Referring to FIG. 7, the first overturning members 220 disposed to be spaced at uniform 120 degree intervals apart and configured to turn over a heated surface of the object to be cooked by 180 degrees under the control of the motor driving portion 330 may be formed on an inner surface of the induction-exclusive container 200. Corresponding thereto, the position indication portions 210 may also be formed to be spaced at 120 degree intervals, and the motor driving portion 330 may intermittently rotate the induction-exclusive container 200 at 120 degree intervals by controlling the motor on the basis of contact made by the position detection portion 115 according to a recipe mode. Here, since the first overturning member 220, the position indication portion 210, the motor driving portion 330, the position detection portion 115, and the like have been described above, a detailed description thereof will be omitted below.

Figure 8:
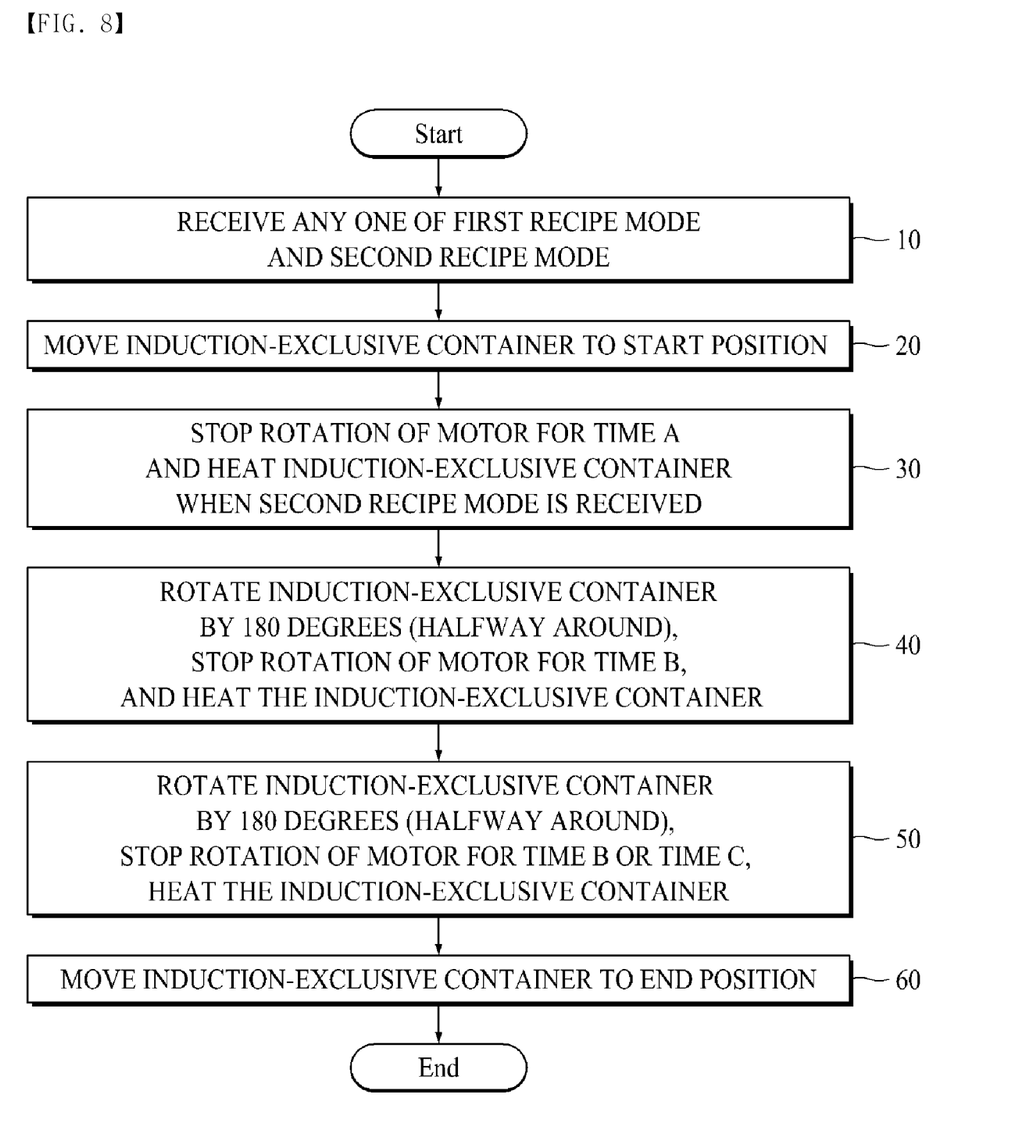
FIG. 8 is a schematic flowchart illustrating a cooking method using the induction range of FIG. 1.

Also, a cooking method using the induction range will be described below in detail. FIG. 8 is a schematic flowchart illustrating a cooking method using the induction range of FIG. 1. Referring to FIG. 8, in a first operation 10, any one of a first recipe mode and a second recipe mode is received according to an object to be cooked which is selected by a user. Here, the first recipe mode and the second recipe mode are determined depending on which one between continuous operation and intermittent operation of the motor is necessary in a cooking process.

Here, conditions for the motor such as a rotation time, rotation speed, and rotation period, and the like thereof and conditions for the heating coil portion 112 such as a heating level, heating time, and the like thereof according to the first recipe mode may be stored in the recipe memory portion 310. Also, conditions for the motor such as a rotation time, rotation speed, and rotation period, and the like thereof and conditions for the heating coil portion 112 such as a heating level, heating time, and the like thereof according to the second recipe mode may be stored in the recipe memory portion 310.

Subsequently, in a second operation 20, the induction-exclusive container 200 is moved to a start position. As described above, the position detection portion 115 may generate a signal for moving the induction-exclusive container 200 to the start position using a difference in contact times according to contact areas of the position indication portions 210. Accordingly, the motor driving portion 330 may adjust a rotation angle position of the induction-exclusive container 200 by controlling the motor to move the induction-exclusive container 200 to the start position.

The second recipe mode according to one embodiment needs intermittent operations of the motor. In a third operation 30, when the second recipe mode is received, rotation of the motor is stopped for a preset time a using the motor driving portion 330, and the induction-exclusive container 200 is heated using the heating coil operation portion 320.

In a fourth operation 40, after the time a passes, the induction-exclusive container 200 is rotated by 180 degrees (halfway around) by driving the motor, the rotation of the motor is stopped for a preset time b using the motor driving portion 330 when the induction-exclusive container 200 has rotated by 180 degrees, and the induction-exclusive container 200 is heated using the heating coil operation portion 320. On the other hand, in the fourth operation 40, after the time a passes, the induction-exclusive container 200 may be rotated by 120 degrees (one-third round) by driving the motor, the rotation of the motor may be stopped for a preset time b using the motor driving portion 330 when the induction-exclusive container 200 has rotated by 120 degrees, and the induction-exclusive container 200 may be heated using the heating coil operation portion 320.

In a fifth operation 50, after the time b passes, the induction-exclusive container 200 is rotated again by 180 degrees (halfway around) by driving the motor, the rotation of the motor is stopped for the preset time b or another preset time c different from the time b using the motor driving portion 330 when the induction-exclusive container 200 has rotated by 180 degrees, and the induction-exclusive container 200 is heated using the heating coil operation portion 320. On the other hand, in the fifth operation 50, after the time b passes, the induction-exclusive container 200 may be rotated again by 120 degrees (one-third round) by driving the motor, the rotation of the motor may be stopped for the preset time b or the other preset time c different from the time b using the motor driving portion 330 when the induction-exclusive container 200 has rotated by 120 degrees, and the induction-exclusive container 200 may be heated using the heating coil operation portion 320.

The fourth operation and the fifth operation may be repetitively performed according to a cooking sequence and the cooking conditions included in the second recipe mode. In a sixth operation 60, the induction-exclusive container 200 is moved to an end position. The position detection portion 115 may generate a signal for moving the induction-exclusive container 200 to the end position using a difference in contact times according to contact areas of the position indication portions 210. Accordingly, the motor driving portion 330 may adjust a rotation angle position of the induction-exclusive container 200 by controlling the motor to move the induction-exclusive container 200 to the end position.

Meanwhile, when the first recipe mode is received instead of the second recipe mode in the first operation, the rotation of the motor is continued using the motor driving portion 330 and the induction-exclusive container 200 is heated using the heating coil operation portion 320.

According to the embodiments of the present invention, a variety of effects including the following effects may be provided. However, the present invention is not limited to the following effects.

An induction range having an automatic double side roasting function according to one embodiment of the present invention has an automatic cooking function with respect to a variety of types of food using an induction technique.

In more detail, the induction range may automatically perform an operation of turning over or mixing food and be adequate for doubled-side roasting for a fish or the like which needs to be uniformly roasted over an upper surface and a lower surface thereof. Also, the induction range can be aesthetically tidy and be improved to be conveniently cleaned and easily used and manipulated.

Also, separate components can be produced by unit modules so as to maximize convenience in maintenance/operation as well as minimizing maintenance/operation costs. Also, separate components can be easily coupled to one another so as to be easily exchanged and replaced even when a failure or the like occurs.

Accordingly, the induction range having an automatic double side roasting function can improve qualities, performance, and the like thereof overall and secure overall competitiveness corresponding to consumer needs.

Although the exemplary embodiments of the present invention have been described above, the scope of the present invention is not limited to the above particular embodiments and may be adequately changeable within the scope disclosed in the claims.

What is claimed is:

1. An induction range having an automatic double side roasting function, comprising:
a body having an internal space in which a heating coil portion configured to perform induction heating and a rotating rod configured to provide torque of a motor are formed;
an induction-exclusive container which is inserted into and mounted in the body to be tilted from the ground at a first angle and is continuously or intermittently rotatable inside the body by the rotating rod and in which an object to be cooked which is accommodated therein is cooked by induction heat transferred from a side surface of the induction-exclusive container; and
a control portion comprising a recipe memory portion configured to store a plurality of preset recipe modes, a heating coil operation portion configured to control an operation of the heating coil portion, and a motor driving portion configured to control the motor,
wherein the induction-exclusive container has a shape of which a radius gradually increases in a direction from a bottom part toward an opening surface of an inlet,
wherein each pair of first overturning members disposed to face each other at 180 degree intervals and configured to turn over a heated surface of the object to be cooked by 180 degrees under the control of the motor driving portion is formed on an inner surface of the induction-exclusive container,
wherein each of the first overturning members comprises:
a holding surface portion which is one side thereof and formed as a flat surface;
a first curved portion which is the other side and intersects with an end of the holding surface portion and extending to be concave inward;
an assistance surface portion extending from the first curved portion and formed to be convex outward so as to assist an operation of turning over the object to be cooked by 180 degrees; and
a second curved portion formed to extend from the assistance surface portion toward the inner surface of the induction-exclusive container.

2. The induction range of claim 1, wherein a position indication portion protruding outward is formed on the bottom part of the induction-exclusive container, and
wherein a position detection portion configured to detect a rotation angle position of the induction-exclusive container using a method of coming into contact with the position indication portion is formed on the body adjacent to the bottom part of the induction-exclusive container.

3. The induction range of claim 2, wherein the control portion further comprises a position input portion configured to determine whether the induction-exclusive container is aligned using the position detection portion, and
wherein the motor driving portion adjusts a rotation angle of the induction-exclusive container by controlling the motor on the basis of a signal of the position detection portion.

4. The induction range of claim 2, wherein the position indication portion comprises a first position indication portion and a second position indication portion which have different contact areas and are disposed to face each other, and
wherein the position detection portion generates a signal for moving the induction-exclusive container to a start position or an end position using a difference in contact times according to contact areas.

5. The induction range of claim 2, wherein the motor driving portion rotates the induction-exclusive container by 180 degrees intermittently by controlling the motor on the basis of contact made by the position detection portion according to the recipe mode.

6. The induction range of claim 1, wherein second overturning members protruding inward and configured to turn over a heated surface of the object to be cooked under the control of the motor driving portion are formed on a bottom part of the induction-exclusive container.

7. The induction range of claim 1, wherein one or more discharge holes located at a certain height from a bottom part of the induction-exclusive container are formed in the side surface of the induction-exclusive container.

8. The induction range of claim 1, wherein the control portion further comprises an alarm portion configured to generate a variety of alarm messages related to a cooking state during a sequential cooking process according to the recipe mode.

9. The induction range of claim 1, wherein the body further comprises a camera module configured to capture images of a cooking state inside the induction-exclusive container in real time.

* * * * *